United States Patent [19]

Carpio

[11] Patent Number: 5,364,510
[45] Date of Patent: Nov. 15, 1994

[54] SCHEME FOR BATH CHEMISTRY MEASUREMENT AND CONTROL FOR IMPROVED SEMICONDUCTOR WET PROCESSING

[75] Inventor: Ronald A. Carpio, Austin, Tex.

[73] Assignee: Sematech, Inc., Austin, Tex.

[21] Appl. No.: 17,224

[22] Filed: Feb. 12, 1993

[51] Int. Cl.$^5$ .............................................. G01N 27/26
[52] U.S. Cl. ................................ 204/153.1; 204/409;
204/406; 204/434; 204/412
[58] Field of Search .............. 204/409, 406, 434, 412,
204/153.12, 153.1

[56] References Cited

U.S. PATENT DOCUMENTS

| | | | |
|---|---|---|---|
| 2,617,940 | 11/1952 | Giguere | 250/43.5 |
| 3,387,496 | 6/1968 | Broerman | 73/422 |
| 3,539,455 | 11/1970 | Clark, Jr. | 204/1 |
| 3,902,970 | 9/1975 | Levin | 195/103 |
| 4,040,908 | 8/1977 | Clark, Jr. | 195/103 |
| 4,118,649 | 10/1978 | Shwartzman et al. | 310/337 |
| 4,170,520 | 10/1979 | Weaver | 435/288 |
| 4,197,369 | 4/1980 | Weaver | 435/12 |
| 4,212,938 | 7/1980 | Gruber et al. | 435/11 |
| 4,260,680 | 4/1981 | Muramatsu et al. | 435/14 |
| 4,326,940 | 4/1982 | Eckles et al. | 204/406 |
| 4,340,448 | 7/1982 | Schiller et al. | 204/1 |
| 4,353,983 | 10/1982 | Siddiqi | 435/11 |
| 4,427,772 | 1/1984 | Kodera et al. | 435/27 |
| 4,517,291 | 5/1985 | Seago | 435/14 |
| 4,525,265 | 6/1985 | Abe et al. | 204/403 |
| 4,680,271 | 7/1987 | Williams | 436/55 |
| 4,714,673 | 12/1987 | Kessler et al. | 435/14 |
| 4,857,152 | 8/1989 | Armstrong et al. | 204/1 |
| 4,874,501 | 10/1989 | Christiansen et al. | 204/415 |
| 4,875,972 | 10/1989 | Williams et al. | 156/664 |
| 4,875,973 | 10/1989 | Heikkila et al. | 156/664 |
| 4,886,590 | 12/1989 | Tittle | 204/406 |
| 4,909,908 | 3/1990 | Ross et al. | 204/1 |
| 4,915,781 | 4/1990 | Bohnen et al. | 156/664 |
| 4,937,038 | 6/1990 | Sakai et al. | 376/245 |
| 4,971,901 | 11/1990 | Hayashi et al. | 435/176 |
| 5,081,045 | 1/1992 | McGill | 436/135 |
| 5,206,145 | 4/1993 | Cattell | 204/153.12 |
| 5,223,222 | 6/1993 | Ricchio et al. | 204/409 |
| 5,225,321 | 7/1993 | Hayashi et al. | 204/153.12 |

OTHER PUBLICATIONS

"Dependence of Thin-Oxide Films Quality on Surface Microroughness", IEEE, Tadahiro Ohmi et al., vol. 39, No. 3, Mar. 1992, pp. 537–545.
"A Continuous Electrolytic Analyzer for Acidic or Basic Components of Process Gas Streams", *Analytical Chemistry*, R. L. Burnett et al., V35(11) Oct. 1963, pp. 1709–1712.
"Cheminert ® Valves", pp. 6–7. Product Brochure.
Sybron Brinkmann, p. 3. Product Brochure.

*Primary Examiner*—John Niebling
*Assistant Examiner*—Bruce F. Bell
*Attorney, Agent, or Firm*—William W. Kidd

[57] ABSTRACT

A feedback control system for providing automated and in-situ control of multi-component chemical concentrations in a liquid bath used for semiconductor processing. A sample from the liquid bath is injected into a carrier stream and routed to a conductivity detector and to an amperometric detector. Hydrogen peroxide concentration levels, as well as acidic or basic component concentration levels, are monitored and the measured readings are sent to a processor. If the concentration levels are not within tolerance for a given process, the processor meters in an appropriate amount of a needed chemical or diluting agent in order to bring the bath to an appropriate chemical concentration level. Additional detectors are employed in order to provide other types of analyses of the chemicals or contaminants present in the liquid bath and the amperometric detection need not be necessarily limited to $H_2O_2$.

11 Claims, 2 Drawing Sheets

SCHEME FOR BATH CHEMISTRY MEASUREMENT AND CONTROL FOR IMPROVED SEMICONDUCTOR WET PROCESSING

BACKGROUND OF THE INVENTION

1. Field of the Invention

The present invention relates to the field of process chemical baths, particularly hydrogen peroxide containing baths, and more particularly, to a scheme for monitoring and controlling aqueous baths which are utilized for semiconductor manufacturing.

2. Prior Art

Chemical solutions have been utilized extensively for the manufacture of semiconductor devices. Wet chemical processing baths have been used for cleaning semiconductor wafers, as well as for etching deposited films on these wafers. For example, the use of hydrogen peroxide ($H_2O_2$) containing solutions for cleaning silicon semiconductor wafers is well known. In addition to wafer cleaning, hydrogen peroxide is utilized in combination with sulfuric acid for photoresist removal and in combination with phosphoric acid, sulfuric acid or ammonium hydroxide for selective titanium etching.

It is known that to ensure uniform processing in advanced VLSI (very large scale integrated circuit) and ULSI (ultra large scale integrated circuit) manufacturing, it is critical to maintain a chemical composition of a bath at a specified concentration level. Alternatively, more uniform processing can be attained by measuring the solution concentration and adjusting the wafer processing time to compensate for changes in solution composition. Maintaining specified concentration levels is especially complicated in hydrogen peroxide based solutions. For example, in the case of an $NH_4OH$—$H_2O_2$—$H_2O$ bath used for particle removal from wafers at elevated temperatures in a megasonic type bath, hydrogen peroxide decomposition to oxygen and water occurs rapidly and $NH_3$ is lost from the bath due to its high vapor pressure. In other types of hydrogen peroxide baths, water loss by evaporation can lead to concentration changes.

At most semiconductor fabrication facilities, liquid processing baths are used for a certain time period and then discarded. This practice not only results in high chemical costs, but it also leads to the generation of more waste than would be required. Environmentally, it is preferred to reduce such waste.

In more advanced manufacturing facilities, automated controllers are utilized to achieve some degree of chemical composition control. These controllers spike the bath with certain chemicals at predefined intervals and can also add one or more chemicals to the bath to make up for a drop in the bath liquid level. With the exception of liquid level sensors, no analytical instrumentation is employed to provide feedback for guiding the chemical composition adjustment process. Thus, departures from "normal" operating conditions are not detected, nor are appropriate corrective actions taken.

Intermittent bath analysis can be performed by manually taking samples from the bath for purposes of analysis. This sample is then rushed to a laboratory for assay of the particular chemical of interest. A common chemical analysis technique utilizes a visual titration for $H_2O_2$ using standardized permanganate solution. Often delays, in having the analysis performed, can lead to erroneous results. Safety issues and manpower constraints also combine to make periodic sampling of baths a rarity. Another deterrent to this method of bath monitoring is that the introduction of a sampling container into the bath, especially by a human operator, increases the chance of introducing contaminants into the chemical bath.

Although the methods of bath operation and testing outlined above have been adequate for manufacturing prior art semiconductor devices, such techniques are cumbersome and not reliable for providing substantially continuous and/or in-situ monitoring of a wet chemical bath.

In the manufacture of state-of-the-art and future generations of semiconductor devices, it is appreciated that the specified tolerances for chemical composition in such baths will require tighter tolerances. In order to manufacture even smaller submicron semiconductor devices, as well as improving the manufacturing yield, it is imperative that other schemes for maintaining a tighter control on the chemical make-up of a liquid processing bath is desired. In order to ensure uniform processing, such as uniform cleaning without surface damage, stripping and/or etching, it is imperative to continually monitor and, if necessary, appropriately adjust the concentration level of chemicals in an aqueous bath without human interaction.

The present invention provides for a scheme in which substantially continuous, frequently repetitive and/or in-situ monitoring of the chemical bath can be obtained and, further, such measured data can be analyzed and computed in order to automatically control the composition of a bath. In the case of $H_2O_2$ baths, it is usually essential to measure and control more than one component at the same time. Moreover, this scheme provides for an analytical methodology which can be most easily implemented in a semiconductor fabrication facility with reasonable cost and a lower probability of introducing deleterious contamination within the facility. This scheme also provides for desired analytical accuracy.

SUMMARY OF THE INVENTION

A wet processing bath analysis and feedback control system for semiconductor processing is described. In one embodiment, a sample is pumped from a bath or taken as a slipstream from a filtration recirculation loop where it is under pressure. Then, this sample is introduced into a flow injection analysis system. After suitable pretreatment of a specific volume of the sample, which usually includes bubble removal and dilution, a conductivity sensor is used to establish the acid or base component concentration and an amperometric sensor is utilized to determine the hydrogen peroxide concentration. In addition, the methodology described can easily be extended to measure and control minor components (such as the reaction products) or trace contaminants (such as trace metals, trace anions and particles).

Flow injection analysis methods are used since tubing in the range of 0.5 mm (internal diameter) and below can be utilized. As a consequence, only bath samples in the microliter size range, as well as smaller volumes of reagents or no reagents in some instances), are required. Moreover, commercially available flow-through sensors which have been developed for high pressure liquid chromatography applications can be employed for the application of the present invention.

In addition, inert tubing, fitting and multiport valves are commercially available. Other advantages of flow injection analysis include rapid response, excellent reproducibility, ease of calibration, ability for high sampling frequency, application of a closed system, and a relatively short exposure time of the detector to the analyte which increases detector life and reduces response deterioration.

The use of ionic conductivity for the measurement of the acidic or basic component of multi-component $H_2O_2$ solutions is made possible by the fact that the conductivity of these solutions can be fitted to an empirical equation and is generally a linear function with the solution conductivity or reciprocal of the solution resistance being the independent variable and the acid or base component concentration being the dependent variable.

The analysis of $H_2O_2$ is performed electrochemically by a technique known as amperometry. In this approach the $H_2O_2$ is oxidized at a platinum electrode which is maintained at a fixed positive potential with respect to a suitable reference electrode and at a pH in the range of 7 to 10. Such a pH adjustment is required in some instances, since at low pH the oxidation of $H_2O_2$ is shifted into the region where it coincides with water oxidation. The current response of the amperometric detector, usually in the microampere or nanoampere range, is directly proportional to the $H_2O_2$ concentration. Calibration of the detector using solutions of known concentrations provides the requisite benchmark.

In order to provide in-situ control of wet (liquid) baths, a computer is coupled to control the various devices associated with transporting, injecting and analyzing the sampled liquid. By continuous or frequent sampling during use, chemicals can be readily added to the bath if parameters being controlled are out of tolerance.

DETAILED DESCRIPTION OF THE PREFERRED EMBODIMENTS

A wet processing bath measurement and analytical feedback control system for semiconductor wafer processing is described. In the following description, numerous specific details are set forth, such as specific devices, measuring techniques, chemical compositions, etc., in order to provide a thorough understanding of the present invention. However, it will be obvious to one skilled in the art that the present invention may be practiced without these specific details. In other instances, well known processes and structures have not been described in detail in order not to unnecessarily obscure the present invention.

It is to be noted that the chemical used as an example throughout the description is hydrogen peroxide $H_2O_2$. The present invention was developed based on providing control of baths comprising of $H_2O_2$ as one of the composition chemicals in the bath and, more specifically, controlling the $H_2O_2$ concentration level of the bath. However, it is appreciated that the present invention can be readily adapted to other chemistries as well.

Figure 1:
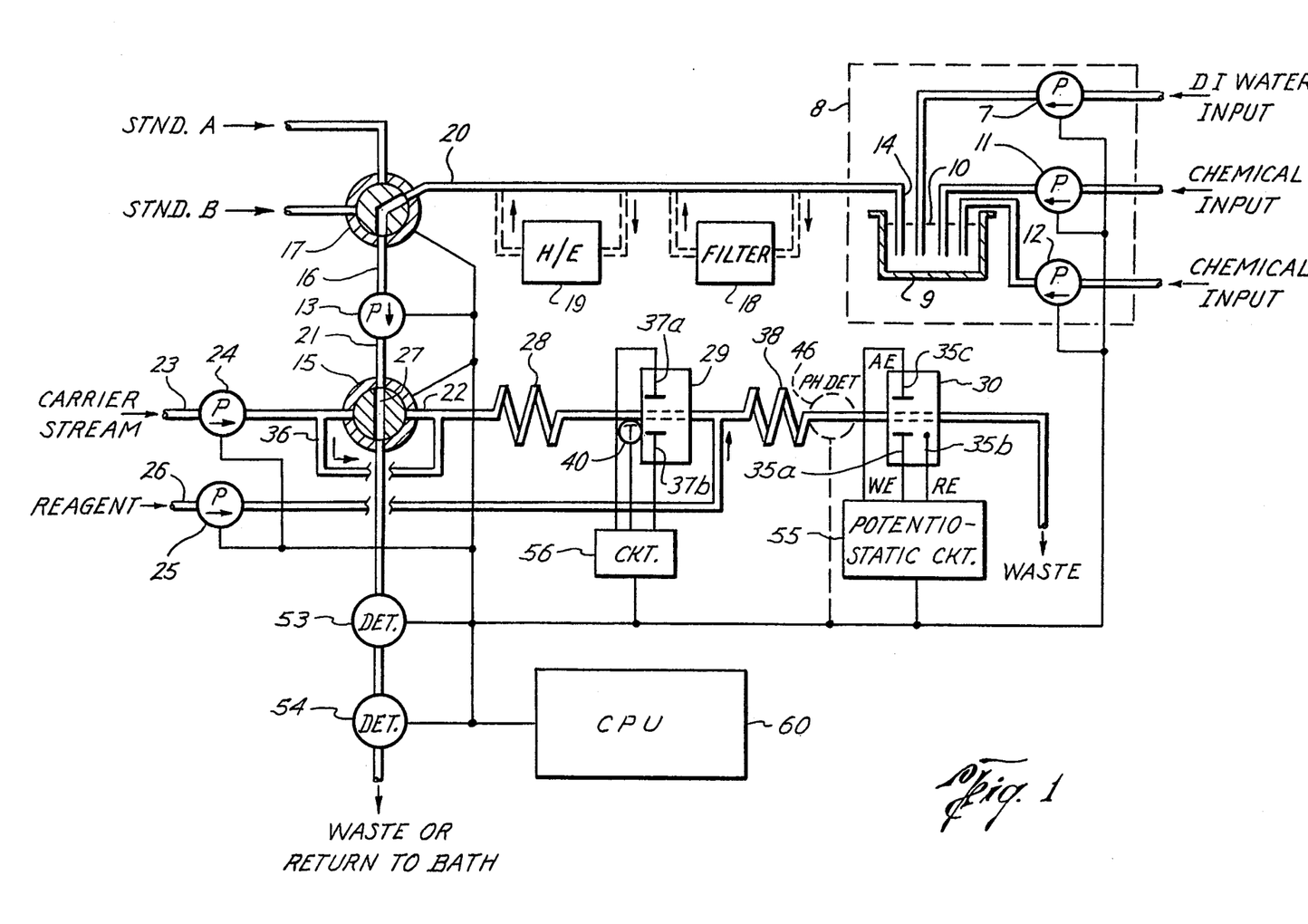
FIG. 1 is a schematic diagram of a measurement and control system of the present invention for a chemical wet bath.

Referring to FIG. 1, a measurement, analysis and feedback control system for controlling chemical composition in an aqueous (wet or liquid) processing bath is shown. Bath 10, contained within enclosure 9, is utilized to provide a wet processing bath for one of a variety of wet processing techniques known for processing a semiconductor wafer. The various chemicals (typically in solutions) are pumped from a chemical source (not shown). A chemical solution is pumped by the use of a chemical metering pump 11, which meters the amount of the particular chemical solution being introduced into bath 10. In this particular example, a second chemical solution is introduced into bath 10 by the use of a second chemical metering pump 12, which pumps the second chemical solution from a separate chemical source (not shown). Furthermore, a third metering pump 7 is utilized to meter and pump deionized (DI) water into bath 10.

It is to be appreciated that additional chemicals can be pumped into bath 10 from a separate source through additional chemical metering pumps and that only two chemistries are shown in FIG. 1 in order to simplify the explanation of the present invention. In this particular example, the first chemical can be hydrogen peroxide ($H_2O_2$), while the second chemical being pumped through metering pump 12 can be of a variety of wet chemicals which are combined with $H_2O_2$ for processing a semiconductor wafer, such as a silicon wafer. One such example of a second chemical component is sulfuric acid ($H_2SO_4$), which can be combined with $H_2O_2$ in bath 10 and used to strip photoresist or other organics from a wafer.

Some other examples of $H_2O_2$ baths are:
$H_2O_2$-$H_3PO_4$-$H_2O$ for titanium etching and metal stripping;
$H_2O_2$-$NH_4OH$-$H_2O$ for wafer cleaning, particle/organic removal;
$H_2O_2$-$HCl$-$H_2O$ for trace metal removal; and
$H_2O_2$-$HF$-$H_2O$ for wafer cleaning and metal removal.

Furthermore, it is to be noted that water, preferably DI water, is typically pumped into bath 10 for the purpose of diluting the solution to a desired level. Accordingly, the actual chemicals introduced into bath 10 will depend on the particular process desired. $H_2O_2$ is exemplified throughout this description, since it is a more readily used chemical in wet processing baths. In most instances, the second chemical (noted in the example above as: $H_2SO_4$, $H_3PO_4$, $NH_4OH$, $HCl$ and $HF$) in typical semiconductor baths will have an acidic or basic property.

In FIG. 1, a sampling tube 14 is disposed within bath 10 in order to draw a sample of the solution from bath 10. It is to be appreciated that the manner in which the sample is taken is not essential to the operation of the present invention, as long as the sampling process does not introduce contaminants into bath 10.

A slipstream sampling method, well known in the prior art, is another non-contaminating sampling technique available. The slipstream sampling method has an added advantage in that since most baths now have a recirculation system for continuous filtration, a slipstream from the recirculation loop allows for samples to be taken without introducing a tube into the bath 10. In the slipstream technique, the solution is pumped from and returned to bath 10 in order to keep the solution circulating. This continual recirculation of the solution insures composition homogeneity in the bath 10. A slipstream sample is taken from this recirculation loop. Furthermore, a sample drawing pump, such as pump 13, would not be necessary with the slipstream sampling technique, since the liquid would be pumped by the recirculation pump.

The bath 10 (and generally the metering pumps 7, 11-12) are part of an assembly usually contained within an equipment housing or cabinet and is accordingly shown as bath assembly 8. In the preferred embodiment, a sampling line 20 couples the sampled liquid to a rotary valve 17. Valve 17 is a multiple-position valve in which one of the positions couples line 20 to line 16. When a sample is to be taken, line 20 is coupled to line 16 and to a pump 13, which when activated draws a sample of the solution from bath 10. The sampled liquid is then injected into a rotary injector valve 15.

It is to be appreciated that rotary valve 17 need not necessarily be used to practice the present invention. Line 20 can be readily coupled directly to line 16. However, valve 17 is useful in selecting other lines which can be coupled to line 16. One or more calibration standards (shown as STND A and STND B) can be coupled as inputs to the rotary valve 17. Upon selection, these calibration standards can be used to calibrate the rest of the system. For example, $H_2O_2$ of a known concentration can be introduced as a calibration medium STND A to calibrate the system. By knowing the concentration of a particular standard, the rest of the system can then be benchmarked or calibrated based on the known concentration.

Additionally, it is to be noted that a filter 18 and/or a heat exchanger 19 can be inserted serially in line 20 to provide for functions which can enhance the overall system performance. If the liquid in bath 10 has a raised temperature, making the liquid "hot", then the heat exchanger will provide cooling of the sampled liquid. For example, cooling will reduce the rate, or quench, the $H_2O_2$ decomposition reaction. With the use of a fine porosity filter for filter 18, it will disperse any large bubbles which will lead to inaccuracies in establishing the volume of a sampled liquid. However, it should be noted that the use of filter 18 is discouraged if any particle counts are to be taken from the sampled liquid since particles can be trapped by the filter.

Line 16 is coupled to provide the sampled liquid to injector valve 15. In an "off" state, injector valve 15 is aligned to permit the liquid to be passed through the valve, in this instance to detectors 53 and 54. Alternatively, if detectors 53–54 are not needed, then the liquid can be passed through and either collected as waste or returned to bath 10. The above described flow path of the sampled liquid is noted as the sampling path 21 for the system of FIG. 1.

A second path 22 (also noted as an analysis path) is comprised of a carrier stream 23, pump 24, injector valve 15, mixing coil 28, conductivity detector 29, mixing coil 38 and an amperometric detector 30. A buffer or a diluting solution is used as a carrier stream 23, which is pumped to an inlet of pump 15 when pump 15 is activated. Pump 24 is utilized to pump the carrier stream 23 if the solution is being drawn from a reservoir. In a pressurized system, pump 24 would not be needed. This flow injection system utilizing valve 15 also has an added advantage in that samples in the microliter size range only need to be taken, resulting in a use of smaller size components, including tubing, in the range of 0.5 mm (internal diameter), as well as a use of smaller quantities of buffers and/or reagents.

A preferred liquid for the carrier stream 23 is DI water. DI water is preferred due to its availability in an ultra pure state. Moreover, it is not overly complex to obtain DI water from a pressurized line. If a pressurized carrier is used as the carrier stream 23, then pump 24 is not necessary since the pressure would force the carrier stream liquid through path 22.

Injector valve 15 is the mechanism utilized to introduce a sample of the bath solution from sampling path 21 into the analysis path 22. Injector valve 15 when activated (for example, in the "on" state) injects a predetermined volume of the solution into path 22. This can be illustrated by the presence of a predetermined volume 27 within valve 15 being rotated 90 degrees in FIG. 1 when valve 15 is activated. That is, the liquid being sampled would have been previously drawn from bath 10. The flow of the liquid within the sampling path 21 causes the liquid to flow through valve 15 and filling volume 27. Then, when valve 15 is activated, this predetermined volume 27 containing the sample is injected into the analysis path 22. A typical volume for the sample volume 27 is on the order of 5 microliter. This sample volume 27 of the sampled liquid will be diluted when mixed with the carrier stream 23 as it is pumped (or forced) into the analysis path 22.

The injected sample is coupled to the mixing coil 28 in order to mix with the carrier stream 23. This is done so that the sample is diluted by a desired factor, usually in the order of several hundred. The dilution is needed in most instances in order to reduce the concentration level of the sample, so that it will be within the range of the conductivity detector 29 and/or amperometric detector 30.

A conductivity measurement can be performed in either an undiluted or diluted solution. An advantage of dilution is that it reduces the amount of sample required and it generally brings the concentration level of the sample to a measurable range (having linear relationship) for conductivity detectors. The dilution scheme of the present invention performs the flow injection analysis procedure in a reproducible manner and in a single stage.

The sample volume 27 of approximately 5 microliter is injected into the carrier stream 23 which has an approximate flow rate of 1.0–2.5 ml/minute. Mixing of the sample volume 27 and the carrier stream 23 is achieved in the mixing coil 28. Mixing coil 28 is basically a large and long conduit.

The sample volume 27 and the diluent flow rate of the carrier stream 23 can be selected (and varied) to obtain different dilution factors, also known as dispersion coefficients. The dispersion coefficients can be varied over the range of approximately 10 to 200 in the single stage unit of the present invention. If greater dilutions are warranted, then additional stages can be readily implemented. Thus, the conductivity range of the sample flowing to conductivity detector 29 will be determined by the properties of the particular detector 29 utilized. For example, it will depend on the detector 29 cell dimensions which determine the cell constant. In those instances when dilution is not necessary for conductivity measurements, it is possible for the conductivity detector 29 to be positioned in the sampling path 21 instead of in the analysis path 22.

Although a variety of conductivity detectors can be used for detector 29, it is preferred to use a rapid response detector. Detectors having this measurement characteristics are well-known in the prior art and provide for rapid response to a flowing fluid. The amplitude (peak response) of the detected signal is governed by the continuous concentration gradient of the dispersed sample in the carrier stream 23. The maximum of this peak occurs at the greatest sample concentration. Thus, it is possible to select a zone on the peak which represents different dilutions of the sample 27, if so desired. However, it is often more desirable for accuracy and for ease of automation to integrate the peak signal to obtain the overall concentration level of the original sample volume 27.

It should also be noted that the measured resistance of the solution in the flow-through conductivity cell type detector is given by the equation $$R = (L/A)(1/K) \qquad (1)$$

where R is the measured resistance, L is the distance between the two electrodes, A is the electrode area and K is the solution conductance. The ratio L/A is known as the cell constant. It is evident that the sensitivity of the measurement can be varied by variations in the cell volume resulting from changes in the electrode area/distance ratio. Often in practice this is achieved by merely changing the inner shape and thickness of the gasket used to separate electrodes 37a and 37b of the conductivity detector 29.

Furthermore, it should be noted that generally in conductivity measurements of this type, the cell resistance is determined without inducing an electrolysis of the solution. That is, the applied potential is kept at a very low value (in the low mV range) to prevent electrolysis from occurring. Typically, low amplitude potential pulses are applied across the electrodes 37a-b and the current response is measured at an appropriate time during the pulse cycle so that the resistive (and not the capacitive) component is measured.

In FIG. 1, the conductivity detector 29 is used to determine the concentration level of the acidic/basic component (the second chemical component) of bath 10. The conductivity measurement is a means of correlating an empirical value to the concentration level of the acidic/basic component. Since temperature affects this calculation, a temperature sensor 40 is coupled to measure the liquid temperature at detector 29. Alternatively, temperature sensor 40 can be included as part of detector 29.

Past the conductivity detector 29, a reagent 26 is introduced into the path 22 up-flow from mixing coil 38 and detector 30. The purpose of the reagent 26 is to adjust the ionic conductivity or pH of the sample after the conductivity measurement has been achieved. This adjustment for proper pH balance of the solution may be necessary for a subsequent amperometric measurement. By buffer addition to the sample after the conductivity detector 29, ionic conductivity of the sample can be readily varied in addition to the pH which may be necessary for optimum performance of the amperometric detector 30.

A pump 25 is used to pump the reagent 26 into path 22. Again, if the reagent 26 is pressurized, then pump 25 is unnecessary. The reagent 26 is mixed with the solution from the conductivity detector 29 in mixing coil 38. Mixing coil 38 functions equivalently to coil 28 in mixing the fluid. The amount and type of the reagent injected into the stream of path 22 is a design choice and will depend on the sample and the diluent. In many instances, proper dilution values can be readily calculated. Typical buffer reagents for use in pH balancing are described later in the description.

However, in order to ensure that the proper pH level is attained, a pH detector 46 can be readily inserted in path 22, preferably between mixing coil 38 and detector 30. Alternatively, a pH detector 46 can be included as part of detector 30. Thus, the output of the mixing coil 38 is coupled to the pH detector 46, if used, and then to the inlet of the amperometric detector 30.

The purpose of the amperometric detector 30 is to quantitatively determine the $H_2O_2$ concentration of the sample solution sent to it on path 22. The operation of an amperometric oxidation of $H_2O_2$ is well known in the prior art. Techniques for detecting $H_2O_2$ are described in U.S. Pat. Nos. 4,427,772; 4,340,448; 4,909,908; and particularly 3,902,970. Thus, a variety of known amperometric detectors can be readily used for amperometric detector 30 of the present invention. Two preferred types of amperometric detectors for use with the present invention are the flow-through cell design and the other is a self-contained cell design.

Both cell types are well-known in the prior art. For example, a flow-through cell amperometric detector is available as a "Pulsed Electrochemical Detector Model PAD-2" from Dionex Corporation of Sunnyvale, Calif. A self-contained detector is available as "Model 3001", "Model 3002" or "Model 3005" from Universal Sensors, Inc. of Metairie, La. Amperometric detectors are also available from Bioanalytical Systems, Inc. of West Lafayette, Ind., and Brinkman Instruments, Inc. of Westbury, N.Y.

A typical amperometric detector will have a working electrode 35a, reference electrode 35b and auxiliary (or counter) electrode 35c. The amperometric oxidation of $H_2O_2$ occurs at the working electrode 35a when the $H_2O_2$ containing quantity of liquid passes through detector 30. In the amperometric analysis, a fixed potential is maintained between two of the electrodes 35 (namely, working electrode 35a and reference electrode 35b) and the current which is generated by the reaction and which passes between the working electrode 35a and the counter electrode 35c is measured. The electrical current is proportional to the concentration of the $H_2O_2$ in the liquid in the cell of the detector. For example, if a platinum electrode is employed, the oxidation can be conducted at approximately +700 mv with respect to a silver/silver chloride reference electrode.

It should be noted that $H_2O_2$ can also undergo reduction, and it is the reduction reaction (its ability to function as an oxidizing agent) which makes $H_2O_2$ useful in semiconductor processing. An advantage to the use of the oxidation reaction for the analysis is that the oxidation reaction is not as susceptible to interferences as the reduction reaction. For example, if a negative, reductive potential was employed, trace metal ions such as copper and zinc would interfere, as would the presence of any dissolved oxygen.

It should also be noted that at least two electrodes 35a and 35b must be used to quantitatively determine the $H_2O_2$ concentration. Aside from a suitable working electrode 35a, such as platinum or glassy carbon working electrode, a second electrode is used. This second electrode serves as both a reference and a counter electrode. However, in many instances, it is more desirable to use an amperometric detector utilizing three separate electrodes. That is, to have a separate reference electrode 35b and an auxiliary (counter) electrode 35c.

The amperometric technique of detection is well-known for the detection of oxygen and hydrogen peroxide in the biological fields, especially for enzymatic processes. Yet, there are certain unique aspects of the semiconductor industry which must be considered in employing the amperometric method for $H_2O_2$ analysis. Firstly, the $H_2O_2$ concentration levels are orders of magnitude higher on a molar scale than the concentrations encountered in biological enzymatic processes. Because some form of attenuation will most likely be required, the amperometric detector 30 of the present invention is positioned in the analysis path 22 which has the sampled liquid diluted. The earlier discussion pertaining to the dilution of the liquid for providing a measurable range for the sample is applicable here as well for amperometry. Another approach to reducing the oxidation current to a measurable range is to limit the area of the working electrode.

Figure 2:
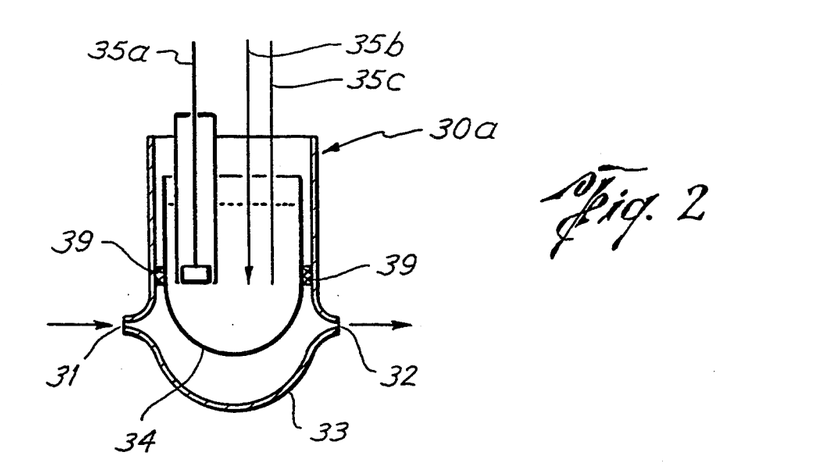
FIG. 2 is an illustration of one type of self-contained amperometric detector which can be used with the present invention.

A special type of amperometric detector is shown in FIG. 2. Amperometric detector 30a is of a self-contained, "flow-through" type and is shown comprised of a cell 33, a membrane 34 and electrodes 35a–c. The cell 33 holds the liquid while the membrane 34 is either a microporous or semipermeable membrane which is coupled into the cell 33 and sealed to the cell 33 by O-rings 39. The membrane 34 is disposed so that the flow of the liquid into inlet 31 and out of the cell 33 at outlet 32 occurs on one side (lower portion in FIG. 2) of the membrane 34, while the electrodes 35 are located on the opposite side of the membrane 34 and are immersed in an electrolyte solution. The $H_2O_2$ molecules contained within the liquid which passes through cell 33 are able to traverse the membrane 34 barrier and then diffuse to the working electrode 35a where they are oxidized. The rate at which the $H_2O_2$ molecules cross the membrane 34 is dependent upon the type of membrane used.

Thus, membranes having different properties can be selected depending on the particular measurement scheme desired. The membrane 34 may be porous or it may be perm-selective (i.e. semi-permeable). Furthermore, the sensitivity of the amperometric method can be controlled by the use of a hydrophilic or hydrophobic membrane as membrane 34 in order to appropriately control the mass transport of the liquid to the electrodes 35.

Hydrophilic membranes are easily wet by water and, therefore, do not offer much impediment to the transport of ions across the membrane. Hydrophilic membranes function by microfiltration or dialysis. Hydrophobic membranes, on the other hand, are not susceptible to wetting by water. Transport of molecular species, such as $H_2O_2$, occurs by a permeation process, so that the diffusion of $H_2O_2$ across the membrane occurs slowly. Accordingly, the decrease in the sensitivity of the amperometric process by the use of hydrophobic membranes, is another technique for attenuating the measurement range of detector 30. As an additional example, it is to be noted that a hydrophobic membrane in conjunction with a plastic cell body make it possible to monitor the $H_2O_2$ concentrations in hydrofluoric acid solutions which under other conditions would attack the electrodes or the electrode casings.

As noted above, a variety of amperometric detectors can be readily used for detector 30. However, in order to provide the necessary electrode potential, an electrical power source along with appropriate current monitoring circuitry must be coupled to detector 30. A potentiostatic circuit 55 in FIG. 1 is utilized to provide these functions. Potentiostatic circuit 55 is coupled to amperometric detector 30 to establish the necessary voltage at the working electrode 35a, as well as a current monitoring circuit to measure the current. The value of the current measured between the working and auxiliary electrodes is proportional to the concentration of $H_2O_2$ of the liquid present in the amperometric detector 30. Circuit 55 also provides the necessary input/output (I/O) function for coupling the signal to a processor.

A number of known circuitry (as well as devices) can be readily used to provide these functions for the amperometric detector. Some manufacturers of amperometric detectors will often provide the associated electronics which can be incorporated into circuit 55. Furthermore, a specialized electrical circuit 56 is coupled to the conductivity detector 29 and temperature sensor 40 for providing the necessary electrical circuitry, as well as providing for the I/O function. Circuitry 56 includes provisions for temperature compensation and such circuitry 56 is known in the prior art.

It is to be further noted that the physical location of the circuits 55 and 56 is not critical to the operation of the present invention and such circuits 55 and 56 can be mounted directly as part of their detectors 30 and 29 or, alternatively, located at some distant location from the electrodes of detectors 30 and 29, respectively. Further, all or some of the components of the circuits 55 and 56 can be fabricated on printed circuit cards which can plug into a card slot of a personal computer (PC), where such PC is used as CPU 60.

Finally, the outlet of detector 30 is coupled for removal of the liquid. Unless some other use of the liquid is desired, the liquid is collected as waste. It is to be noted that the detector 30, as well as detector 29 should be flushed clean in order to take subsequent sample readings. In order to do this cleansing, valve 15 can be activated and the carrier stream is used to flush out the analysis path 22. Alternatively, by the use of a bypass path 36 around injector valve 15, it will permit the analysis path 22 to be flushed out without operating valve 15.

In order to provide substantially continuous, frequent and/or in-situ measurement and control of the chemical concentration in the wet process bath 10, a processor, denoted by CPU 60, is utilized with the present invention. The CPU 60 is coupled, directly or indirectly, to various devices of FIG. 1. Thus, CPU 60 is coupled to control the operation of pumps 13, 24 and 25 (if any are used), injector valve 15, rotary valve 17, circuits 55 and 56, as well as to pH detector 46, if used. It is also preferred to have CPU 60 coupled to metering pumps 7, 11 and 12 in order to control pumps 7, 11 and 12 and to provide feedback to the CPU 60 as to the quantity of fluid flowing through pumps 7, 11 and/or 12.

In operation, when chemical concentration (such as $H_2O_2$) determination is to be made, pump 13 is activated to draw a sample of the solution from bath 10 into the sampling line 20 and valve 17 is activated to couple line 20 to line 16. If pump 13 is not used, then only valve 17 need be controlled. After a predetermined delay, which delay permits for a quantity of the sampled liquid to fill the predetermined volume 27 within injector valve 15, CPU 60 activates injector valve 15 in order to introduce the predetermined quantity of liquid 27 into path 22.

Pump 24 is activated by CPU 60 to draw on the carrier stream 23. If the carrier stream 23 is pressurized, then pump 24 is not needed. The predetermined quantity of the sampled liquid 27 is combined with the carrier stream 23 and forced into mixing coil 28 for proper mixing to occur. The diluted liquid is sent to the conductivity detector 29 for conductivity detection.

The conductivity detection is desired in order to determine the acidic or basic component of the sampled liquid. The conductivity value, along with the temperature value, are processed by CPU 60 to obtain the concentration level of the acidic/basic component, such as $H_2SO_4$, of bath 10.

For the subsequent amperometric detection and measurement of $H_2O_2$, it is preferred for the diluted sample to have a pH in the range of 7 to 10, since at low pH the oxidation of $H_2O_2$ is shifted into the region where it coincides with water oxidation. Therefore, at low pH levels, water will oxidize and contribute to providing erroneous readings. At proper pH levels (7 to 10) and at adequate conductivity levels, a reagent is not needed. However, if needed, the reagent 26 is injected into path 22 and mixed with the sample liquid in coil 38. The amount to be injected can be readily precalculated for a given bath or, alternatively, the pH detector 46 can be included to ascertain the proper pH range.

An example of a buffer reagent for reagent 26 is a solution containing a conjugate acid-base pair. The acid will react with any hydroxyl ions which are added to the solution, while the conjugate base will react with any added hydrogen ions. For example, a 0.1 molar (mole/liter) phosphate buffer which has a pH of 6.8 is made by the combination of potassium dihydrogen phosphate and disodium hydrogen phosphate dodecahydrate. Other buffers include 0.1M ammonia/ammonium chloride in DI water and ammonium tartrate buffer.

After the conductivity measurement is performed to determine the chemical concentration of the acidic/basic component of the bath and the reagent added, if necessary, the sample is sent to the amperometric detector 30 for amperometric detection of $H_2O_2$. If the readings from the two detectors 29 and 30 denote an unacceptable concentration level of one or both chemicals, appropriate chemical(s) or DI water can be added to bath 10 by CPU 60 by introducing the appropriate chemical(s) or DI water into bath 10. This is achieved by activating the appropriate pump(s) 7, 11 and/or 12 and metering the amount of liquid being introduced into bath 10.

In actual practice, the CPU 60 continuously (or at frequent time intervals) monitors the output of circuits 55 and 56. Prior to any sampling, background levels are measured for detectors 29 and 30 in order to establish the background metrics. Once the analysis has begun, the carrier stream 23 will sweep the analytes of interest through the detectors 29 and 30. The detectors will respond to these analytes and this response is noted in terms of a peak signal of some finite time duration. The time elapsed between sample introduction by injector valve 15 and peak response will depend upon the tubing dimensions and the flow rate of the carrier stream 23. The peak shape will also depend upon the flow rate and the manner in which it is dispersed within the carrier stream.

Provided that the flow rate of the carrier stream 23 is fairly constant and the system parameters do not change, the signal response will be similarly repeated with changes in the peak height (or peak area, if integrated), reflecting changes in analyte concentration. If the reagent 26 is to be added, then CPU 60 will inject the reagent 26 after obtaining the conductivity reading. The reagent can be flowing at all times or it could be introduced at the proper time dependent upon a timing scheme. It is also possible to utilize a parallel rather than the a serial arrangement of the detectors 29 and 30. This would require a different (parallel) plumbing arrangement to obtain the conductivity and amperometric readings.

Upon completion of the concentration measurement, CPU 60 causes the carrier stream 23, through the bypass 36, to flush out the analysis path 22. The CPU 60 then resets the system for taking subsequent measurement readings and then, repeats the cycle described above in order to take the next sample from bath 10 to obtain the next concentration reading. The cycle can be repeated until the chemical concentration level of the bath 10 reaches a level within an acceptable tolerance. It is appreciated that various cycling schemes can be readily devised to take the various readings from the flow diagram of FIG. 1.

As is noted in FIG. 1, detectors 53 and 54 are shown coupled to the outlet of injector valve 15. In the "off" state, sampled liquid of path 21 is coupled to these detectors. Detectors 53 and 54 operate as ancillary detectors for measuring other properties of the liquid in bath 10. Only two detectors 53 and 54 are shown at the outlet of the sampling path, but the actual number is a design choice. A variety of detectors known in the prior art can be selected to provide a number of measurements, which measurements will depend on the type of liquid in bath 10 and the parameter being controlled.

A variety of devices can be used for detectors 53–54 for such functions as detecting the particulate level, the pH, ionic conductivity, refractive index and/or the ultra-violet (UV) visible spectra of the sampled liquids. Thus, minor components (such as the reaction products) or trace contaminants (such as trace metals and other particles) can be readily detected and compensated by use of an appropriate detector for detectors 53–54. It is appreciated that detectors 53–54 are placed in the sampling line and essentially samples the undiluted liquid from bath 10. Thus, those detection techniques requiring undiluted samples of the bath solution can be placed at the location of detectors 53–54. As was noted earlier, conductivity detectors not requiring dilution can also be placed herein along with a temperature sensor.

It is possible in some instances that the analytical data derived from these detectors 53 or 54 may be sufficient for the controlling of the bath 10. For example, in the case of aqueous HF baths, the conductivity can be related to the HF concentration. This is also true of the refractive index of HF solutions. Thus, by monitoring the ionic conductivity or the refractive index of the sample, HF concentration can be determined without using the analysis path 22. In the case of some $H_2O_2$ solutions, such as hydrogen peroxide/phosphoric acid/water baths the absorption spectrum provides correlation to the $H_2O_2$ concentration.

As is noted in FIG. 1, the sample injected by valve 15 can be diluted by the carrier stream 23. The particular diluting solution used is dependent on the particular sample being injected into the stream. The composition of carrier stream 23 is a design choice depending upon the intended goal of the analysis and bath being controlled, but DI water is the preferred choice. In some instances, it may be preferable to use a dilute acid or base as the carrier stream 23, in order to employ a neutralization reaction between the carrier stream and the sample. The dilute acid/base carrier at the conductivity detector 29 would have a high background conductivity, due to the relatively high ionic mobility of the ions. Thus, the observation of interest is noting a decrease in conductivity in detector 29.

In the case of the amperometric detection of $H_2O_2$, the diluted solution should have a suitable ionic conductivity and pH control is important. Thus, pH detector 46, if used, will ensure that the pH is within the permitted range.

In another variation, the carrier stream can be of a deoxygenated buffer solution in which the diluted sample can then be routed through a polarographic sensor, rather than a conductivity detector, for heavy metal analysis. Again, the actual liquid selected for the carrier stream 23 is based on the sample selected and the type of test being performed.

Although not shown, the output of the amperometric detector 30, instead of being directed to waste, can be further processed by other detection devices. Detectors requiring dilution and/or adjustment of the sample can be readily placed in this position. For example, liquid or ion chromatographic or polarographic detection can be provided. Ion chromatography can be employed for both cation and anion analysis. The type and number of such other detectors is a design choice.

As was noted earlier, the various pumps, valves, detectors and circuits of FIG. 1 are coupled to CPU 60. CPU 60 provides the control and obtains the required readings from the various detectors. Thus, in operation, CPU 60 will select and operate the necessary hardware device, obtain required measurement readings and process the data obtained. The processed data is then used to provide feedback to control the bath or other devices coupled to CPU 60.

It is appreciated that any one or a plurality of analysis can be achieved by this system under complete control of the CPU 60. When a particular analysis is achieved, appropriate corrections can be applied as feedback to the appropriate device to obtain a particular desired result, such as bringing the concentration of a particular chemical in a bath to its desired tolerance level. In the case of concentration determination of the second component by conductivity analysis, the concentration/conductivity calibration curve of the particular diluted solution generally can be fitted to an empirical equation, which is generally linear, with the reciprocal of the solution resistance being the independent variable. This equation can be readily used by the CPU 60 to compute the original bath composition.

Thus, an automated monitoring, analysis and feedback system for controlling the concentration level of chemicals, especially $H_2O_2$, in a wet bath is provided. Also, the system of the present invention provides for continuous or frequent readings of concentration levels and in-situ readings while the bath is in actual use, thereby permitting in-situ adjustments of the chemical concentration levels of bath 10.

It is further appreciated that CPU 60 can control additional pumps, valves and other devices besides those that are shown in FIG. 1. For example, if additional chemicals are combined in bath 10, additional chemical metering pumps can be readily added for controlling the amount of the desired chemicals being introduced into bath 10.

The system of FIG. 1 is designed to measure and control $H_2O_2$ concentration levels in an aqueous bath, but it can be readily adapted for other solutions as well without departing from the spirit and scope of the present invention. Further, the present invention can be readily adapted for a particular aqueous bath as desired. For example, in the case of simpler baths (such as an aqueous HF bath), not all of the features of this system are necessary. Additionally, other types of devices can be readily adapted to provide similar function as the amperometric detector of the present invention. For example, $H_2O_2$ component can be determined directly by the use of a photometric detector operating in the UV. Also, either a colorimetric technique (which relies upon the production of a colored product from $H_2O_2$ and suitable reagents) or a calorimetric method (which is based upon the heat produced by the catalytic decomposition of $H_2O_2$) can be substituted and adapted for use in place of the amperometric detection technique.

It is also to be noted that although the main purpose of this particular system is for bath component concentration control, it can also be readily utilized for particulate and/or trace metal ion and trace anion contamination monitoring, either exclusively or in conjunction with the chemical concentration monitoring function. Furthermore, although devices can be used to pump the liquid, it is preferred that pressurized systems be used to provide flow injection analysis.

The CPU 60 provides the necessary processing capability to monitor and control the various components shown coupled to it in FIG. 1. It should be noted that some form of interface, including analog-to-digital or digital-to-analog conversion, will probably be required between CPU 60 and the various components. Additionally, since the current response from the amperometric detector is usually in the microampere or nanoampere range, circuits 55 and 56 will require some form of signal amplification to obtain measurement readings. Finally, CPU 60 will require associated memory to retain the necessary data for a given chemistry in a given process.

It is to be appreciated that although the preferred embodiment described above is more desirable, in some instances a simpler design may be necessitated by constraints placed on the design (i.e., cost). Two alternative embodiments are described herein for providing a simpler computer controlled feedback scheme.

In the first scheme, the amperometric detector of FIG. 2 is adapted for use as a "dip-cell" in which the membrane 34 and the electrodes 35, including the electrolyte, are removed from the cell housing 33 and partially immersed directly in the process bath 10 of FIG. 1. Provided that the detector cell has been cleansed prior to use, the electrodes will not contaminate the bath with ionic impurities, if a hydrophobic membrane is used as membrane 34. That is, the hydrophobic membrane will be chemically inert in most instances and will isolate the electrodes from the bath liquid. The membrane thickness will be selected appropriately for the bath being monitored. The thicker the membrane, the lower the permeation rate of $H_2O_2$. Thus, the membrane thickness will be selected to insure that the $H_2O_2$ concentration is within the range of the particular sensor utilized.

As other molecular species are present, consideration must be given to the permeation of one or more of the species across the membrane. For example, $NH_3$ can alter the pH of the electrolyte within the detector. Either buffering or periodic electrolyte replacement can be employed to overcome this problem.

The electrodes are coupled to a potentiostatic circuit (similar to circuit 55) which provides the measured data to a processor, such as CPU 60. The processor would then control the metering pumps for injecting the appropriate chemical (or DI water) to bath 10.

Figure 3:
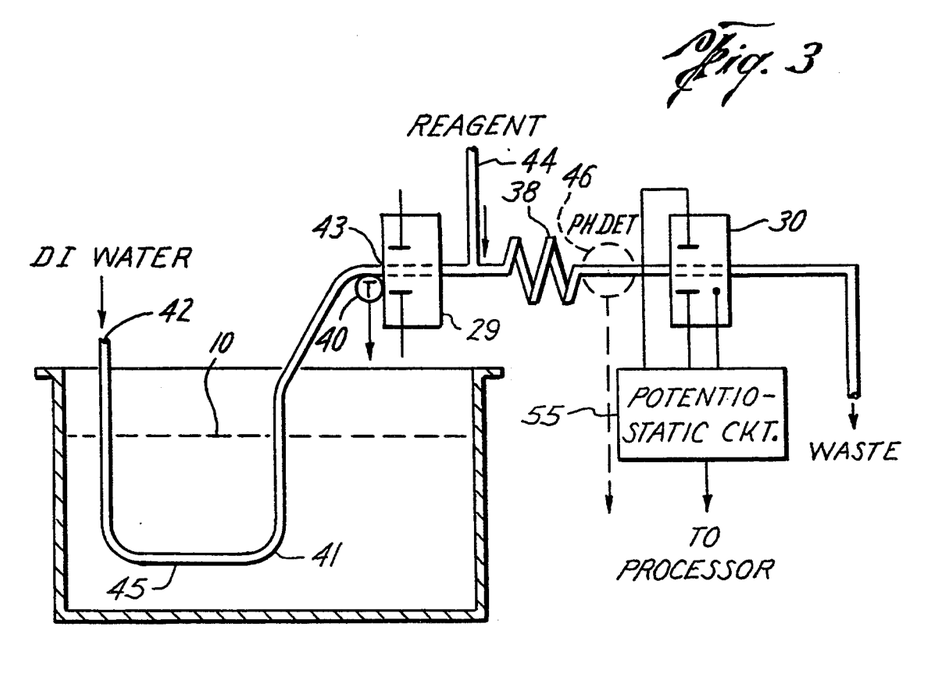
FIG. 3 is an illustration of a simpler multi-component detection technique which can be used as an alternative embodiment.

The second scheme is shown in FIG. 3. In FIG. 3, a hydrophobic tube 41 (or membrane device) is immersed directly in bath 10. DI water is coupled to inlet opening 42. The other end of the tube is coupled to an input of a conductivity detector. Essentially, this outlet end 43 is coupled into the line, which is shown as analysis path 22 in FIG. 1, at the input of the conductivity detector 29.

The DI water is passed through the interior of tube 41 and this water serves as an absorber or acceptor stream for the $H_2O_2$ and other molecular species (such as $NH_3$, HCl and HF) which are capable of permeating through the tube wall 45. The permeation rate will depend on the wall material, wall thickness, species present and the bath temperature. Almost in all instances, the bath temperature is tightly controlled.

Thus, for the earlier described two-chemical bath, the analysis to be performed is similar to that described for the system in FIG. 1. The conductivity detector 29 measures the acidic/basic component, while $H_2O_2$ concentration is measured by amperometric detector 30. Again, other detection schemes, such as UV absorption, can be substituted for the amperometric detection. A process monitors the measured data and compensates by injecting chemicals or DI water into bath 10 through processor controlled metering pumps. If necessary, a reagent 44 can be introduced at the output of the conductivity detector for pH adjustment.

There are certain advantages in using the two alternative schemes. A sampling pump and injection valve are not required. Moreover, the permeation rate can be selected such that no dilution is required. In the second scheme, two tubes 41 can be used in which one is coupled to the conductivity detector and the other is coupled to the amperometric detector. However, the disadvantage is that an intrusive device is immersed in the bath. Additionally, this alternative system is not as flexible as the system shown in FIG. 1 for adding additional detectors or controlling the flow paths. Both of the alternative schemes are simpler than the scheme shown in FIG. 1, but are more economical and may provide a lower "cost-of-ownership". If cost is a determining consideration, then these alternative approaches are available.

Thus, a fully automated wet processing bath measurement, analysis and feedback control system is described for use in processing semiconductor wafers, especially silicon wafers.

I claim:

1. A method for monitoring concentration levels of hydrogen peroxide ($H_2O_2$) and a chemical specie, which is either an acid or a base, in a multi-component aqueous bath utilized in semiconductor processing, in order to provide automated feedback to control an amount of said $H_2O_2$ and said chemical specie present in said bath comprising the steps of:

sampling said bath to obtain a solution sample;
mixing a set volume of said sample with a diluting agent in order to provide a diluted sample;
performing a conductivity detection of said diluted sample to measure concentration of said chemical specie in said diluted sample;
performing an amperometric detection of said diluted sample to measure concentration of said $H_2O_2$ said diluted sample;
analyzing concentration measurements of said diluted sample by use of a processor to determine if said $H_2O_2$ and said chemical specie in said bath are within desired concentration levels;
introducing additional $H_2O_2$, chemical specie, other compensating chemical or diluting agent into said bath under control of said processor to adjust said bath to within said desired concentration levels, if adjustment is needed;
wherein said bath is monitored and automatically compensated by said processor to maintain said desired concentration levels of $H_2O_2$ and chemical specie in said bath.

2. The method of claim 1 further including the steps of measuring a pH level of said diluted sample and adjusting said pH level of said diluted sample by introducing a reagent to mix with said diluted sample in order to pH balance said diluted sample, prior to said step of performing said amperometric detection.

3. A method for controlling concentration levels of hydrogen peroxide ($H_2O_2$) and a chemical specie, which is either an acid or a base, in a multicomponent aqueous bath utilized in semiconductor processing, in order to provide automated feedback and control to adjust an amount of said $H_2O_2$ and said chemical specie present in said bath comprising the steps of:

sampling said bath to obtain a solution sample;
injecting a set volume of said sample into a carrier stream of a diluting agent in order to mix said sample with said diluting agent to provide a diluted sample;
measuring temperature of said diluted sample;
performing a conductivity detection of said diluted sample to measure ionic conductivity of said diluted sample which is representative of concentration of said chemical specie in said diluted sample;
performing an amperometric detection of said diluted sample to measure concentration of said $H_2O_2$ in said diluted sample;
analyzing concentration measurements and temperature of said diluted sample by use of a processor to determine if said concentration levels of said $H_2O_2$ and said chemical specie are within set concentration levels for said bath;
introducing additional $H_2O_2$, chemical specie, other compensating chemical or diluting agent into said bath under control of said processor to adjust said bath to within said set concentration levels, if adjustment is needed;
wherein said bath is monitored and automatically compensated by said processor to maintain control of said desired concentration levels for said bath.

4. The method of claim 3 further including the steps of measuring a pH level of said diluted sample and adjusting said pH level of said diluted sample by introducing a reagent to mix with said diluted sample in order to pH balance said diluted sample prior to said step of performing said amperometric detection.

5. An apparatus for monitoring concentration levels of hydrogen peroxide ($H_2O_2$) and a chemical specie, which is either an acid or a base, present in a multi-component aqueous bath utilized in semiconductor processing, in order to provide automated feedback and control to adjust an amount of said $H_2O_2$ and said chemical specie present in said bath comprising:

a sampling device for obtaining a solution sample from said bath;

an injector coupled to said sampling device for combining a set volume of said sample with a diluting agent in order to provide a diluted sample;

a first detector coupled to receive said diluted sample and to perform a conductivity detection of said diluted sample to measure concentration of said chemical specie in said diluted sample;

a second detector coupled to receive said diluted sample and to perform an amperometric detection of said diluted sample to measure concentration of $H_2O_2$ in said diluted sample;

a processor coupled to said first and second detectors for obtaining data pertaining to said concentration of said chemical specie and $H_2O_2$ of said diluted sample, which are representative of concentration levels of said chemical specie and $H_2O_2$ in said bath, processing said data to determine if said concentration of said chemical specie and $H_2O_2$ are within set concentration levels for said bath, and introducing additional $H_2O_2$, chemical specie, other compensating chemical or diluting agent into said bath to adjust said bath to within said set concentration levels for said bath;

wherein said bath is monitored and automatically compensated by said processor to maintain control of said set concentration levels of $H_2O_2$ and said chemical specie.

6. The apparatus of claim 5 wherein said first detector is a conductivity detector and said second detector is an amperometric detector.

7. The apparatus of claim 6 wherein said diluted sample is combined with a reagent to pH balance said diluted sample to a pH range of 7–10 prior to having said second detector detect for $H_2O_2$.

8. An apparatus for monitoring concentration levels of hydrogen peroxide ($H_2O_2$) and a chemical specie present in a multi-component aqueous bath utilized in semiconductor processing, in order to provide automated feedback and control to adjust an amount of said $H_2O_2$ and said chemical specie present in said bath comprising:

a sampling device for obtaining a sample of said solution from said bath and introducing said sample into a first flow path;

injector means coupled to receive said sample from said first flow path and for injecting a set volume of said sample into a second flow path;

a carrier stream coupled to said second flow path for diluting said set volume of said sample to provide a diluted sample;

a temperature sensor coupled to said second flow path for measuring a temperature of said diluted sample;

a conductivity detector coupled to said second flow path for receiving said diluted sample and for performing a conductivity detection of said diluted sample to measure concentration of said chemical specie in said diluted sample;

an amperometric detector coupled to said second flow path for receiving said diluted sample and for performing an amperometric detection of said diluted sample to measure concentration of $H_2O_2$ in said diluted sample;

a processor coupled to said conductivity and amperometric detectors and said temperature sensor for obtaining data pertaining to said temperature and said concentration of said chemical specie and $H_2O_2$, processing said data to determine if said concentration of said chemical specie and $H_2O_2$ is within set concentration levels, for said bath, and introducing additional $H_2O_2$, chemical specie, other compensating chemical or diluting agent into said bath to adjust said bath to within said set concentration levels for said bath;

wherein said bath is monitored and automatically compensated by said processor to maintain control of said set concentration levels of $H_2O_2$ and said chemical specie.

9. The apparatus of claim 8 further having a third flow path coupled to said second flow path for introducing a reagent to mix with said diluted sample to balance said diluted sample to a pH range of 7–10 prior to having said amperometric detector detect for $H_2O_2$.

10. The apparatus of claim 9 further including a switching valve in said first flow path for switching between said sample and a known chemical standard.

11. The apparatus of claim 10 wherein said injector means is an injector valve.

* * * * *

UNITED STATES PATENT AND TRADEMARK OFFICE
CERTIFICATE OF CORRECTION

PATENT NO : 5,364,510
DATED : November 15, 1994
INVENTOR(S): Ronald A. Carpio

It is certified that error appears in the above-identified patent and that said Letters Patent is hereby corrected as shown below:

Column 16, line 5, after "$H_2O_2$" insert --in--.

Signed and Sealed this

Twenty-ninth Day of July, 1997

Attest:

BRUCE LEHMAN

Attesting Officer

Commissioner of Patents and Trademarks